Figure 1:
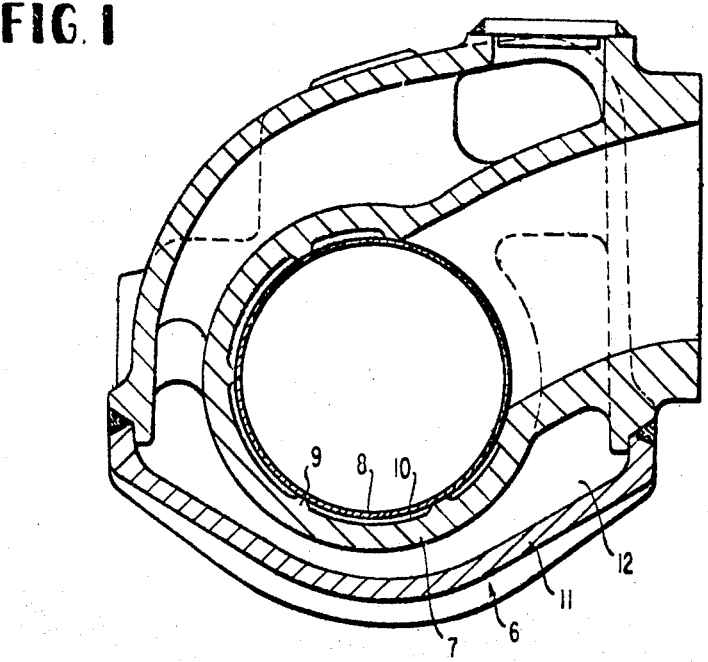

United States Patent [19]
Deutschmann et al.

[11] 3,750,403
[45] Aug. 7, 1973

[54] LINE AND/OR SPACE FOR RECEIVING OR CONDUCTING HOT GASES

[75] Inventors: Herbert Deutschmann, Stuttgart-Bad Cannstatt; Wolfgang Kruczek, Stuttgart; Karl-Heinz De Lazzer, Waiblingen, all of Germany

[73] Assignee: Daimler-Benz Aktiengesellschaft, Stuttgart-Untertuerkheim, Germany

[22] Filed: July 29, 1970

[21] Appl. No.: 59,060

[30] Foreign Application Priority Data
July 29, 1969 Germany................... P 19 38 404.4

[52] U.S. Cl. .................................. 60/323, 60/272
[51] Int. Cl. ............................................ F01r 3/10
[58] Field of Search ................... 123/188 R, 188 A, 123/188 AA, 191 R, 191 A, 191 L, 191 M; 60/29 R, 31

[56] References Cited
UNITED STATES PATENTS

| | | | |
|---|---|---|---|
| 2,858,667 | 11/1958 | Reske | 60/29 R |
| 3,043,094 | 7/1962 | Nichols | 60/29 R |
| 1,926,499 | 9/1933 | Ricardo | 123/191 R |
| 2,600,529 | 6/1952 | Gregory | 123/191 M |
| 2,886,945 | 5/1959 | Hofer | 60/29 R |
| 2,075,388 | 3/1937 | DeCloud | 123/191 R |
| 2,204,294 | 6/1940 | Blanchard | 60/31 |

Primary Examiner—Laurence M. Goodridge
Attorney—Craig and Antonelli

[57] ABSTRACT

A structure forming lines and/or spaces that are preferably provided with a cooling water jacket and serve for the accommodation and/or conduction of hot gases, and which may be utilized as exhaust gas lines and/or combustion spaces of internal combustion engines, particularly of Diesel engines with exhaust gas turbochargers; the lines and/or the spaces are provided with a heat insulation on the side of their wall in contact with the gas; the heat insulation is formed by a sheet metal liner and/or a ceramic layer.

10 Claims, 2 Drawing Figures

LINE AND/OR SPACE FOR RECEIVING OR CONDUCTING HOT GASES

The present invention relates to lines and/or spaces which are preferably provided with a cooling water jacket and serve for the reception and/or guidance of hot gases, preferably, as exhaust gas lines and/or combustion spaces of internal combustion engines, particularly of Diesel engines with exhaust gas turbochargers.

With such types of lines and/or spaces, there occurs the problem that on the one hand, the outer surface temperature of the line or combustion space should be kept low and, on the other, the gas temperature should remain as high as possible. Particularly important is this problem in connection with the lines of Diesel engines having exhaust gas turbochargers because one aims in that case to make available to the turbocharger an energy level which is as large as possible.

With the known prior art constructions, the gas-conducting lines and combustion spaces are provided with a cooling water jacket for keeping down the external temperature of the lines and of the combustion spaces. This cooling water jacket, however, at the same time strongly reduces the exhaust gas temperature and therewith the available energy for the exhaust gas turbocharger.

The present invention aims at providing gas-conducting lines and/or combustion spaces which possess a relatively cool outer skin or surface as a result of a suitable insulation and simultaneously may serve for the conduction or the accommodation of a gas with a high heat energy.

The underlying problems are solved in accordance with the present invention in that the lines and/or spaces are provided with a heat insulation on the wall side in contact with the gas.

In a preferred embodiment according to the present invention, the wall of the line or the combustion space, preferably made of an aluminum casting, is lined on the inner side thereof with a separate wall whereby an air gap exists between the two walls. The wall of the line or of the combustion space may be lined advantageously with a sheet metal wall which is held at a predetermined distance from the wall by means of ridges formed in the casting of the wall or by beads or stiffening corrugations in the sheet metal. An air gap thus results very advantageously between the cast pipe or the wall of the gas space and the sheet metal member whereby the air serves as heat-insulating cushion. A heat transfer takes place only at the narrow contact places of the sheet metal member with the cast pipe or the cast wall at the ridges. The gas-conducting line or the combustion space may be cooled in a customary manner at the outer surfaces thereof by air or cooling water without reducing thereby substantially the exhaust gas temperature on the inside of the line or of the combustion space.

According to a further very advantageous feature of the present invention, an insulating sheet metal lining is cast-in into the line or into the combustion space, which lining lifts off from the wall during the cooling off of the line after the casting as a result of the shrinkage of the material and possibly assumes thereby a shape in the form of folds so that an intermediate space between sheet metal lining and the line wall or between sheet metal lining and combustion space wall is formed thereby. The manufacturing costs can be considerably reduced by casting-in the sheet metal lining. The position and size of the air cap can be predetermined beforehand, for example, by suitable design of the exhaust-gas collecting line or manifold or of the combustion space. However, it is also feasible within the scope of the present invention to utilize other linings as heat insulation.

Advantageously, a ceramic layer may also be applied as heat insulation on the side of the wall in contact with the gas. The application of the ceramic layer may take place by spraying-on. Also, an intermediate layer may be provided intermediate the wall and the ceramic layer.

A further advantage results during the assembly if the gas-conducting lines or combustion spaces of the present invention are constructed multi-partite whereby the separation can take place either in the axial or in the radial direction. It is appropriate, however, to construct the lines separated or subdivided into two half-shells. The half-shells may thus be lined in a simple manner with a heat insulation prior to assembly.

Accordingly, it is an object of the present invention to provide a hollow structure forming a line or space for receiving and/or conducting hot gases, which avoids by simple means the shortcomings and drawbacks encountered in the prior art.

Another object of the present invention resides in a structure forming a line or space for hot gases which permits the attainment of a relatively low external temperature of the structure while maintaining a high energy level of the gas present on the inside thereof.

A further object of the present invention resides in a line or space structure for Diesel engines with exhaust gas turbochargers in which a maximum possible energy level of the exhaust gases is available for the turbocharger without excessive temperatures at the outer surfaces of the structure.

Still a further object of the present invention resides in a line or space structure of the type described above which is relatively simple in construction, utilizes relatively few parts and can be manufactured and assembled without excessive expenditures.

Figure 2:
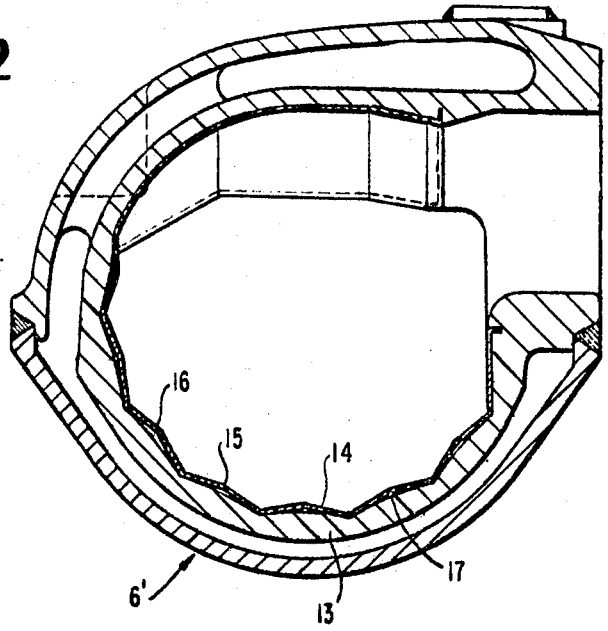

These and further objects, features, and advantages of the present invention will become more obvious from the following description when taken in connection with the accompanying drawing which shows, for purposes of illustration only, two embodiments in accordance with the present invention, and wherein:

FIG. 1 is a transverse cross-sectional view through an exhaust-gas collecting line with an inserted sheet metal lining; and FIG. 2 is a transverse cross-sectional view through a further embodiment of an exhaust gas-collecting line with a cast-in sheet metal lining.

Referring now to the drawing wherein like reference numerals are used throughout the two views to designate like parts, and more particularly to FIG. 1, this figure illustrates an advantageous type of construction of an exhaust-gas manifold or common line, for example, of a Diesel internal combustion engine provided with a turbocharger. The exhaust-gas collecting line generally designated by reference numeral 6 is lined in this embodiment at the inner wall 7 thereof with a sheet metal wall 8 which is held at a predetermined distance from the wall 7 by the ridges 9 provided in the casting of the wall 7 so that an air gap 10 results between the sheet metal wall 8 and the inner wall 7 of the exhaust-gas manifold or line 6. The cast ridges 9 are arranged at a predetermined spacing from one another along the inner wall 7. The air present in the air gap 10 assures a good heat insulation so that the hot gas conducted in the exhaust-gas collecting line 6 is cooled only slightly whereas the cooling water jacket 12 disposed between the inner wall 7 and the outer wall 11 of the exhaust-gas collecting line 6 assures a good cooling of the outer wall 11. Of course, it is also possible that the inner wall 7 of the manifold or common line 6 be constructed smooth and that beads or corrugations be provided in the sheet metal wall 8 which then keep the sheet metal wall 8 at a predetermined distance from the inner wall 7. For the sake of simplicity, such modification is not illustrated in the drawing.

FIG. 2 illustrates a further embodiment for the construction of the exhaust-gas collecting line or manifold generally designated by reference numeral 6'. In this embodiment, a sheet metal liner 14 is cast-in into the exhaust-gas collecting line 6' at the inner wall 13 thereof whereby the liner 14 during the cooling-off of the line, lifts off from the inner wall 13 as a result of the metal shrinkage and forms folds 15 so that an intermediate space 16 is formed between the sheet metal lining 14 and the inner wall 13. The air present in the intermediate space 16 again assures for a very good heat insulation of the hot gas with respect to the external temperature. The position and size of the intermediate spaces 16 can be predetermined beforehand. The inner wall 13 of the exhaust-gas collecting line 6' is provided with raised portions 17 which during the cooling-off phase after the casting, press the sheet metal lining 14 inwardly as a result of the shrinkage of the metal and thus favor a fold formation.

The multi-partite construction of the exhaust gas collecting line and/or of the combustion space which may be subdivided preferably into two half-shells is again not illustrated in the drawing for the sake of simplicity.

While we have shown and described only several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An exhaust gas manifold construction for an internal combustion engine comprising: at least one exhaust duct, an external casing surrounding said duct, said external casing and said duct including portions forming a cooling water jacket therebetween, and a heat resistant sheet metal liner arranged inside of said exhaust duct for preventing hot exhaust gases passing through said duct from directly engaging the inner walls of said duct, wherein said duct and at least part of said external casing are formed as a one-piece cast article, wherein said cooling water jacket is configured for maintaining the temperature of the casting forming the duct lower than the temperature of the liner during engine operation, wherein at least parts of both the inner walls of said duct and the outer surfaces of said liner are constructed tubularly shaped with the inner walls of said duct facing generally inwardly toward the center of the duct and the outer surfaces of the liner generally facing said inner walls, wherein said liner is provided with predetermined folds and is positioned in said duct prior to casting of said duct, the outer surfaces of said liner and said folds being so arranged with respect to the inner walls of said duct that portions of the liner outer surfaces are lifted off from the inner walls of the duct by shrinkage of the duct causing bending of said liner along said folds during cooling of the casting, insulating air spaces being formed between those portions of the liner lifted off from the inner walls and said inner walls.

2. A construction according to claim 1, wherein the folds extend in the longitudinal direction of the duct, and wherein the folds are uniformly distributed around at least a part of the circumference of the inside of the duct.

3. A construction according to claim 1, wherein the inside walls of said duct includes raised portions for pressing the sheet metal lining inwardly to aid in the fold and air space formation.

4. A construction according to claim 1, wherein said duct and external casing are constructed of aluminum and wherein said liner is constructed of heat-resistant steel.

5. An exhaust gas manifold construction for an internal combustion engine comprising: at least one exhaust duct, an external casing surrounding said duct, said external casing and said duct including portions forming a cooling water jacket therebetween, and a heat resistant sheet metal liner arranged inside of said exhaust duct for preventing hot exhaust gases passing through said duct from directly engaging the inner walls of said duct, wherein said duct and at least part of said external casing are formed as a one-piece cast article, wherein said cooling water jacket is configured for maintaining the temperature of the casting forming the duct lower than the temperature of the liner during engine operation, wherein at least parts of both the inner walls of said duct and the outer surfaces of said liner are constructed tubularly shaped with the inner walls of said duct facing generally inwardly toward the center of the duct and the outer surfaces of the liner generally facing said inner walls, and wherein said liner is provided with predetermined folds, the outer surfaces of said liner and said folds being so arranged with respect to the inner walls of said duct that portions of the liner outer surfaces are lifted off from the inner walls of the duct by shrinkage of the duct causing bending of said liner along said folds during cooling of the casting, insulating air spaces being formed between those portions of the liner lifted off from the inner walls and said inner walls.

6. A construction according to claim 5, wherein the folds extend in the longitudinal direction of the duct, and wherein the folds are uniformly distributed around at least a part of the circumference of the inside of the duct.

7. A construction according to claim 5, wherein the inside walls of said duct includes raised portions for pressing the sheet metal lining inwardly to aid in the fold and air space formation.

8. A construction according to claim 5, wherein said duct and external casing are constructed of aluminum and wherein said liner is constructed of heat-resistant steel.

9. A construction according to claim 5, wherein said folds are formed by planar sections of said liner angled with respect to one another, each planar section having a straight edge portion spaced maximally from said inside surface and another opposite straight edge portion in contact with said inside surface, each of the air spaces being bounded by two adjacent planar sections and the inside surface of the duct with the midpoint of the air space being disposed adjacent the maximally spaced edge portions of the planar sections.

10. A construction according to claim 9, wherein any contact between said liner and said duct is exclusively along lines forming the edges of adjacent air spaces and at circumferential connecting places on the liner.

* * * * *